(12) United States Patent
Copus et al.

(10) Patent No.: US 11,853,040 B2
(45) Date of Patent: Dec. 26, 2023

(54) PROXY SYSTEM FOR SYSTEM LOG MESSAGES

(71) Applicant: Rockwell Automation Technologies, Inc., Mayfield Heights, OH (US)

(72) Inventors: James R. Copus, Fairlawn, OH (US); Stephen A. Wenner, Akron, OH (US); Kyle E. Neet, Northfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 102 days.

(21) Appl. No.: 17/360,696

(22) Filed: Jun. 28, 2021

(65) Prior Publication Data

US 2022/0413471 A1 Dec. 29, 2022

(51) Int. Cl.
*G05B 19/418* (2006.01)
*G06F 16/17* (2019.01)

(52) U.S. Cl.
CPC ..... *G05B 19/4185* (2013.01); *G05B 19/4183* (2013.01); *G06F 16/1734* (2019.01)

(58) Field of Classification Search
USPC ........................................................ 700/95
See application file for complete search history.

(56) References Cited

U.S. PATENT DOCUMENTS

| | | | | |
|---|---|---|---|---|
| 8,275,680 B2 * | 9/2012 | Chand | ..................... | G06Q 20/10 705/35 |
| 10,320,747 B2 * | 6/2019 | Palmin | ..................... | H04L 69/16 |
| 10,673,928 B2 * | 6/2020 | Benc | ................. | G06Q 30/0277 |
| 10,739,745 B1 * | 8/2020 | Kretschmann | .......... | H04L 12/56 |

(Continued)

FOREIGN PATENT DOCUMENTS

| | | | |
|---|---|---|---|
| CN | 107645389 A | * | 1/2018 |
| EP | 2500788 A1 | | 9/2012 |
| EP | 2566102 B1 | * | 3/2014 |

OTHER PUBLICATIONS

Gerhards, Rainer, "The Syslog Protocol", Network Working Group, Standards Track, Mar. 2009, 38 pages, Grossrinderfeld Germany.

(Continued)

*Primary Examiner* — Hien D Khuu
(74) *Attorney, Agent, or Firm* — Fletcher Yoder, P.C.

(57) ABSTRACT

An industrial automation system includes a collector component communicatively coupled to a first network and configured to receive one or more event logs via a first communication protocol. The industrial automation system also includes a first industrial automation component communicatively coupled to the first network and the collector component. The first industrial automation component is configured to communicate via the first communication protocol. Additionally, the industrial automation system includes a second industrial automation component configured to communicate via a second communication protocol, generate a first event log representative of a property associated with the second industrial automation component, and send the first event log to the first industrial automation component. The first industrial automation component is configured to convert the first event log into second event log interpretable by the collector component and send the second event log to the collector component via the first network.

20 Claims, 5 Drawing Sheets

(56) References Cited

U.S. PATENT DOCUMENTS

| | | | |
|---|---|---|---|
| 2007/0079028 A1* | 4/2007 | Hall | G05B 19/4186 710/62 |
| 2007/0283194 A1* | 12/2007 | Villella | G06F 11/3476 714/E11.204 |
| 2010/0249952 A1* | 9/2010 | Snide | G05B 19/054 700/9 |
| 2013/0055389 A1* | 2/2013 | Alvarez | H04L 41/069 726/22 |
| 2014/0211657 A1* | 7/2014 | Balasubramanian | H04L 41/0803 370/254 |

OTHER PUBLICATIONS

European Extended Search Report for EP Application No. 22181552.5 dated Nov. 23, 2022; 8 pgs.

* cited by examiner

PROXY SYSTEM FOR SYSTEM LOG MESSAGES

BACKGROUND

The present disclosure generally relates to enabling event reporting for devices in a network, including devices that access the network following different communication protocols or devices connected to a network different than a network that hosts a collector of event reports. More specifically, the present disclosure relates to systems and methods for utilizing event proxy servers and clients to receive events logged by devices that communicate according to different communication protocols and devices that are connected to a different network than the collector.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an industrial automation system includes a collector component communicatively coupled to a first network and configured to receive one or more event logs via a first communication protocol. The industrial automation system also includes a first industrial automation component communicatively coupled to the first network and the collector component. The first industrial automation component is configured to communicate via the first communication protocol. Additionally, the industrial automation system includes a second industrial automation component configured to communicate via a second communication protocol different from the first communication protocol, generate a first event log representative of a property associated with the second industrial automation component, and send the first event log to the first industrial automation component. The first industrial automation component is configured to convert the first event log into second event log interpretable by the collector component and send the second event log to the collector component via the first network.

In another embodiment, a non-transitory computer-readable medium includes instructions that, when executed, cause processing circuitry of a first industrial automation component to receive, log data representative of a property associated with a second industrial automation component from the second industrial automation component using a first communication protocol. The instructions, when executed, also cause the processing circuitry to generate, from the log data, one or more system log messages that are communicable using a second protocol that is different than the first protocol. Additionally, the instructions, when executed, cause the processing circuitry to send the one or more system log messages to a syslog collector or a third industrial automation component using the second communication protocol.

In yet another embodiment, a computer-implemented method includes receiving, via a first industrial automation component, log data from a second industrial automation component using a first communication protocol. The log data is representative of a property associated with the second industrial automation component. The method also includes generating, via the first industrial automation component, one or more system log messages from the log data. Furthermore, the method includes sending the one or more system log messages to a syslog collector via the first industrial automation component using a second communication protocol that is different than the first communication protocol.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to techniques that enable log data (e.g., regarding security or other information associated with an industrial automation system or component) from industrial automation devices that are not on the same network or that do not support a particular communication protocol to be provided to a log collector (e.g., a Syslog collector). More specifically, the techniques described below enable log data to be sent across unconverged networks using several different transport mechanisms and protocols, log messages to be generated from the log data, and the log messages to be provided to a Syslog collector. The log data may then be utilized to make security or control decisions regarding an industrial automation system or the like. As such, these techniques may increase the security of an industrial automation system while enhancing the functionality of industrial automation devices that are not on the same network or that do not support the same communication protocol(s) as a particular log collector component.

Figure 1:
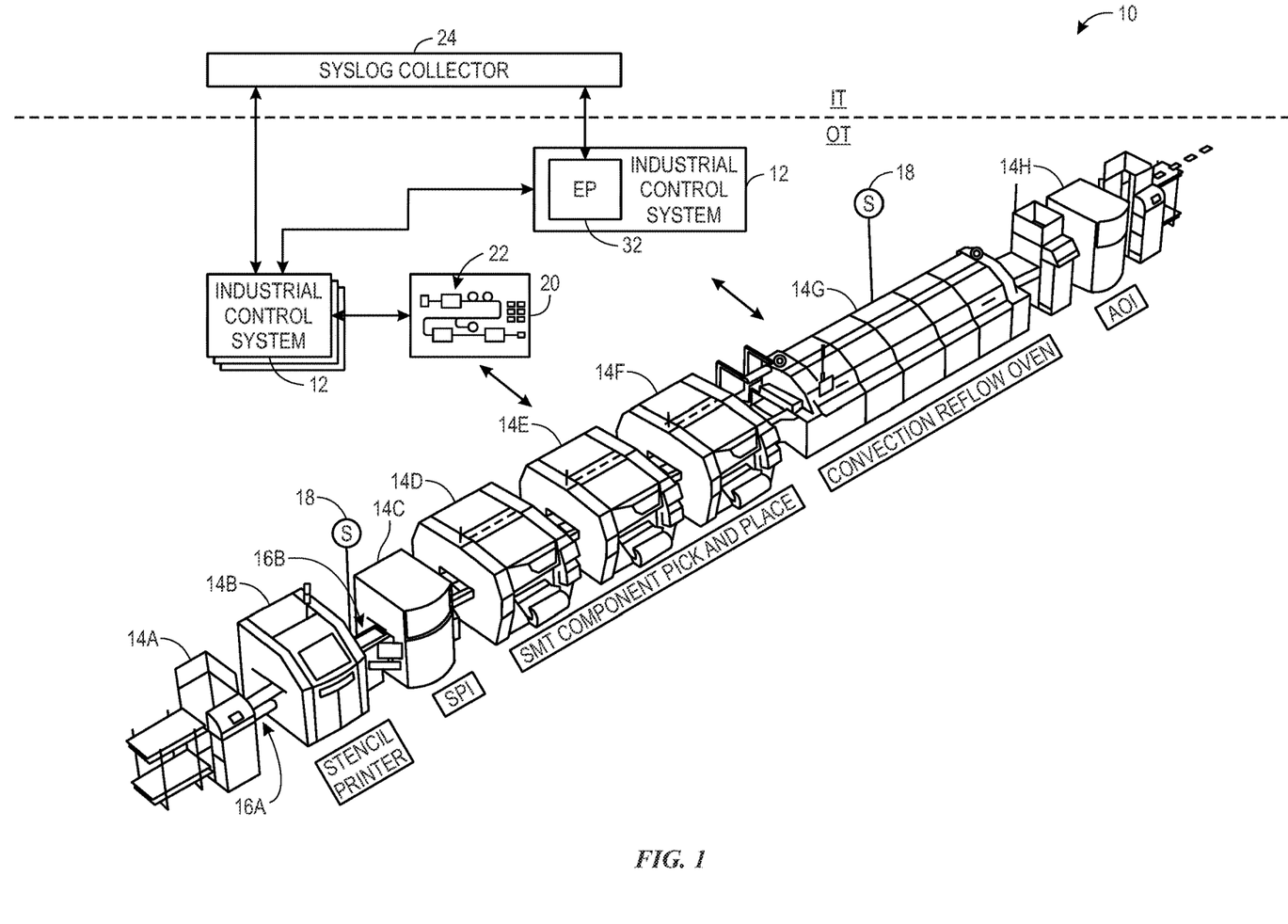
FIG. 1 is a perspective view of an example industrial automation system, in accordance with an embodiment presented herein.

By way of introduction, FIG. 1 is a perspective view of an example industrial automation system 10 in which the present embodiments described herein may be implemented. Referring to FIG. 1, the industrial automation system 10 may be controlled by one or more industrial control systems 12 and may include stations 14 having machine components and/or machines to conduct functions within an automated process, such as silicon wafer manufacturing, as is depicted. The example automated process may begin at a station 14A used for loading objects, such as substrates, into the industrial automation system 10 via a conveyor section 16A. The conveyor section 16A may transport the objects to a station 14B to perform a first action, such a printing solder paste to the substrate via stenciling. As objects exit from the station 14B, conveyor section 16B may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment.

Clearly, for other applications, the particular system, machine components, machines, stations, and/or conveyors may be different or specially adapted to the application. For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with information technology (IT) data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. Moreover, the display/operator interface 20 may facilitate representing components of the industrial automation system 10 through programming objects that may be instantiated and executed to provide simulated functionality similar or identical to the actual components, as well as visualization of the components, or both. The programming objects may include code and/or instructions stored in the industrial control systems 12 and executed by processing circuitry of the industrial control systems 12. The processing circuitry may communicate with memory circuitry to permit the storage of the component visualizations.

As illustrated, the display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

As illustrated, in some embodiments, the industrial automation system 10 may include a Syslog collector 24. The Syslog collector 24 may be a computing device (e.g., a server or computer), data repository, software application, or other suitable component that stores and/or processes logs provided to the Syslog collector 24, such as system log or event messages. More specifically, industrial automation devices (e.g., devices included in the stages 14A-14H, the industrial control system 12, or display/operator interface 20) of the industrial automation system 10 may generate log data pertaining to various features of the industrial automation devices. For example, the log data may include event logs (e.g., messages) indicating potential security issues or threats, initiation or completion of certain tasks or processes, data (e.g., data collected by sensors 18), and the like. The log data and the Syslog protocol, which is an Ethernet protocol that can be used to communicate system log messages between devices (e.g., the Syslog collector 24 and another component of the industrial automation system 10) are described in greater detail in Network Working Group Request for Comments (RFC) 5424, entitled "The Syslog Protocol."

In the industrial automation system, some devices may be connected to a different network than the Syslog collector 24, may not be able to communicate using the Syslog protocol (or other Ethernet protocols such as EtherCAT, EtherNet/IP, PROFINET, POWERLINK, Sercos III, Modbus TCP, CC-Link IE), or both. However, other devices that are connected to the same network as the Syslog collector 24 and may be able to communicate using the Syslog protocol may receive log data from devices that cannot and generate the system log messages. For instance, the data may be received in a different format than system log messages, and the communication protocol used to communicate the data between the two devices may be a communication protocol other than the Syslog protocol. For example, one or more industrial control systems 12 may include an Ethernet port 32 (e.g., an Ethernet adaptor) that is utilized to send system log messages to the Syslog collector 24. It should also be noted that while the industrial control systems 12 are shown having connections to the Syslog collector 24, any component of the industrial automation system 10 may be communicatively coupled to the industrial control systems 12 (e.g., via an ethernet connection or via a device that functions as an event proxy server that can forward system log messages to the Syslog collector 24).

Figure 2:
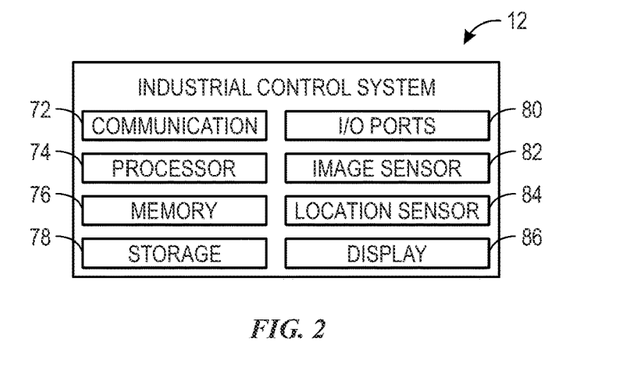
FIG. 2 illustrates example components that may be part of a control/monitoring device that may be included in the industrial control system of FIG. 1, in accordance with embodiments presented herein.

Continuing with the drawings, FIG. 2 illustrates example components that may be part of the industrial control system 12, in accordance with embodiments presented herein. For example, the industrial control system 12 may include a communication component 72, a processor 74, a memory 76, a storage 78, input/output (I/O) ports 80, an image sensor 82 (e.g., a camera), a location sensor 84, a display 86, additional sensors (e.g., vibration sensors, temperature sensors), and the like. The communication component 72 may be a wireless or wired communication component that may facilitate communication between the industrial control system 12, industrial automation equipment (e.g., devices utilized to implement the stages 14A-14H), the Syslog collector 24, and other communication capable devices. For instance, the communication component 72 may include a network interface that may enable the industrial control system 12 to communicate via various protocols such as Ethernet/IP®, ControlNet®, DeviceNet®, or any other industrial communication network protocol. Moreover, the communication component 72 may enable the industrial control system 12 to communicate via various wired or wireless communication protocols, such as Wi-Fi, mobile telecommunications technology (e.g., 2G, 3G, 4G, 5G, LTE), Bluetooth®, near-field communications (NFC) technology, and the like. Furthermore, the communication component 72 communicatively couple the industrial control system 12 to one or more devices (e.g., components of the industrial automation system 10, including the syslog collector 24) via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

The processor 74 may be any type of computer processor or microprocessor capable of executing computer-executable code. The processor 74 may also include multiple processors that may perform the operations described below. The memory 76 and the storage 78 may be any suitable articles of manufacture that can serve as media to store processor-executable code, data, or the like. These articles of manufacture may represent computer-readable media (e.g., any suitable form of memory or storage) that may store the processor-executable code used by the processor 74 to perform the presently disclosed techniques. Generally, the processor 74 may execute software applications that include programs that enable a user to track and/or monitor operations of industrial automation equipment via a local or remote communication link. That is, the software applications may communicate with the industrial control system 12 and gather information associated with the industrial automation equipment as determined by the industrial control system 12, via the sensors 18 disposed in the industrial automation system 10 and the like.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

The I/O ports 80 may be interfaces that may couple to other peripheral components such as input devices (e.g., keyboard, mouse), sensors, input/output (I/O) modules, and the like. I/O modules may enable the industrial control system 12 to communicate with industrial automation equipment or other devices in the industrial automation system 10 via the I/O modules.

The image sensor 82 may include any image acquisition circuitry such as a digital camera capable of acquiring digital images, digital videos, or the like. The location sensor 84 may include circuitry designed to determine a physical location of industrial automation equipment. In one embodiment, the location sensor 84 may include a global positioning system (GPS) sensor that acquires GPS coordinates for the industrial control system 12.

The display 86 may depict visualizations associated with software or executable code being processed by the processor 74. In one embodiment, the display 86 may be a touch display capable of receiving inputs (e.g., parameter data for operating industrial automation equipment) from a user of the industrial control system 12. As such, the display 86 may serve as a user interface to communicate with industrial automation equipment. The display 86 may be used to display a graphical user interface (GUI) for operating industrial automation equipment, for tracking the maintenance of the industrial automation equipment, and the like. The display 86 may be any suitable type of display, such as a liquid crystal display (LCD), plasma display, or an organic light emitting diode (OLED) display, for example. Additionally, in one embodiment, the display 86 may be provided in conjunction with a touch-sensitive mechanism (e.g., a touch screen) that may function as part of a control interface for industrial automation equipment or for a number of pieces of industrial automation equipment in the industrial automation system 10, to control the general operations of the industrial automation system 10. In some embodiments, the operator interface may be characterized as the display/operator interface 20 (e.g., an HMI) or the like.

Although the components described above have been discussed with regard to the industrial control system 12, it should be noted that similar components may make up other computing devices described herein or be included in industrial automation equipment included in the industrial automation system 10. Further, it should be noted that the listed components are provided as example components and the embodiments described herein are not to be limited to the components described with reference to FIG. 3.

Figure 3:
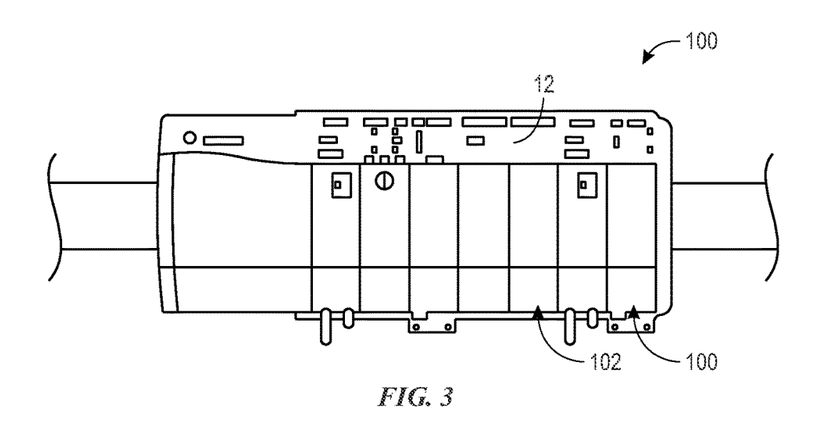
FIG. 3 illustrates a control system that may include control/monitoring device of FIG. 2, in accordance with an embodiment presented herein.
Figure 4:
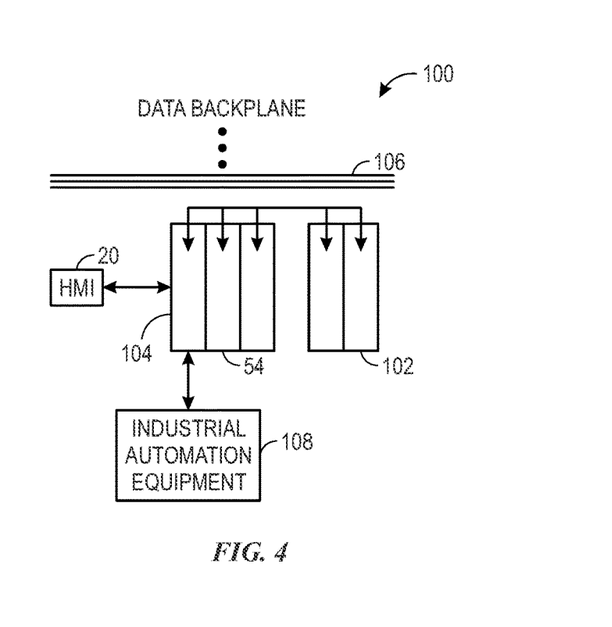
FIG. 4 illustrates a block diagram of a control system that includes the control/monitoring device of FIG. 2 and several modules coupled to one another via a data backplane, in accordance with an embodiment presented herein.

The industrial control system 12 may be part of a collection of modules, such as a control system 100 depicted in FIG. 3. As shown in FIG. 3, the control system 100 may include the industrial control system 12 as a single module of a number of modules that perform various types of operations. For instance, as shown in FIG. 4, the control system 100 may also include an artificial intelligence (AI) module 102 and an input/output module 104. The control system 100 may be coupled to a data backplane 106 that may facilitate communication between modules of the control system 100. More specifically, the industrial control system 12, the AI module 102, and the I/O module 104 may be coupled to each other via the data backplane 106. Additionally, the data backplane 106 may be utilized to send and receive system log messages (e.g., log events related to Syslog) to the Syslog collector 24.

As mentioned above, various components of the industrial automation system 10 may include different types of circuitry that enables the components to communicate with other devices within the industrial automation system 10. However, in some cases, devices may not include a particular type of communication circuitry that is utilized to communicate certain types of data. For example, system log messages may be Ethernet-based event log messages that are generated by industrial automation components included in the industrial automation system 10. Devices that do not include Ethernet communication circuitry may be unable to provide system log messages to the Syslog collector 24. Furthermore, the Syslog collector 24 may be communicatively coupled to a network or backplane other than a network or backplane connected to the industrial automation component. In other words, there may be an unconverged network in which devices are communicatively coupled to a network other than the network to which the syslog collector 24 is communicatively coupled.

Figure 5:
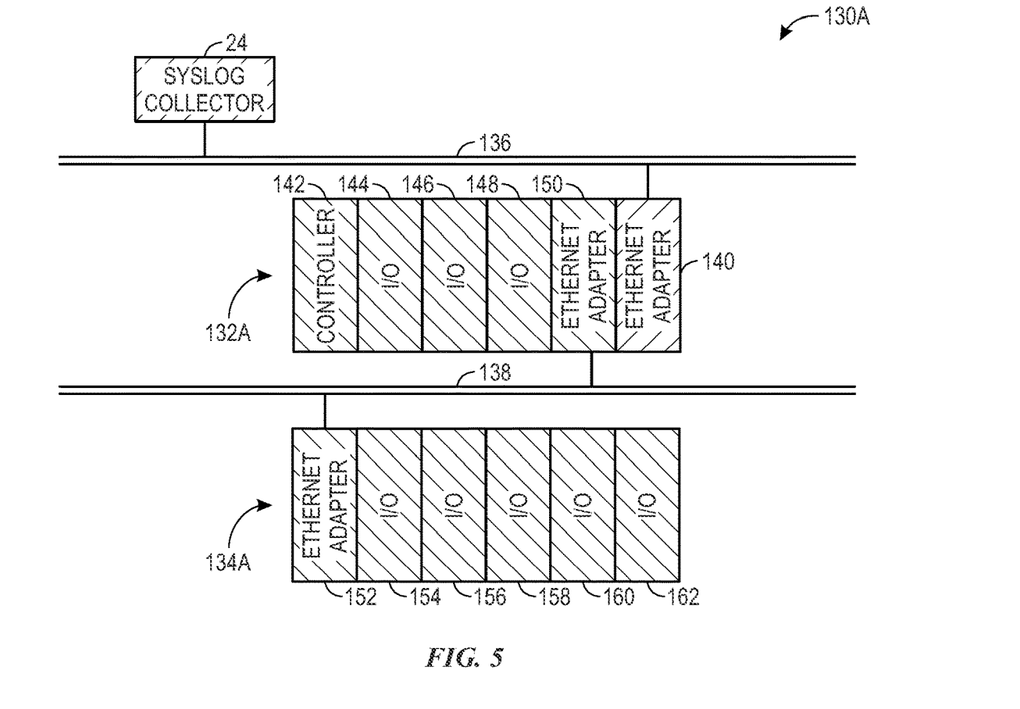
FIG. 5 illustrates a block diagram of an industrial automation system in which log data from some components of the industrial automation system are inaccessible to a system logging protocol (Syslog) collector, in accordance with an embodiment presented herein.

For example, FIG. 5 is a block diagram of an industrial automation system 130A that includes Syslog collector 24, industrial automation devices 132A, 134A, and backplanes 136, 138. It should be noted that the backplanes 136, 138 may be representative of communication networks, backplanes, or both. More specifically, in this particular embodiment, the backplanes 136, 138 may be Ethernet networks.

In some embodiments, the industrial automation device 132A may include an ethernet adapter 140 that is communicatively coupled to the backplane 136, which is also communicatively coupled to the Syslog collector 24. Accordingly, the ethernet adaptor 140 may receive data messages (e.g., log data or messages in a different format than the system log messages) that are incompatible with the Syslog collector 24. As such, the Ethernet adaptor 140 (or processing circuitry associated therewith) may convert the data messages to equivalent system log messages and provide the converted system log messages to the Syslog collector 24 in accordance with an Ethernet protocol. The industrial automation device 132A may also include a controller 142, I/Os 144, 146, 148, and another ethernet adapter 150, each of which may not be communicatively coupled to the backplane 136 (but may be communicatively coupled to one another using other backplanes). For example, the ethernet adaptor 150, which may communicate in accordance with an Ethernet protocol (e.g., syslog protocol), may be communicatively coupled to the backplane 138 but not the backplane 136. Additionally, the controller 142 and I/Os 144, 146, 148 may not be configured to communicate using Ethernet protocols but may be configured to utilize other communication protocols (e.g., ControlNet®, DeviceNet®, etc.). Accordingly, data messages generated by the controller 142, I/Os 144, 146, 148, and the ethernet adapter 150 are unable to be provided to the Syslog collector 24.

In the same manner, the industrial automation device 134A may include an ethernet adaptor 152 that is communicatively coupled to the backplane 138 but not the backplane 136. The ethernet adaptor 152 may support Ethernet communication protocols. The industrial automation device 134A also includes I/Os 154, 156, 158, 160, 162 that are not communicatively coupled to the either of the backplanes 136, 138 and which may communicate with other devices using protocols other than Ethernet protocols. As such, data messages generated by the Ethernet adaptor 152 may be provided to the ethernet adaptor 150 of the industrial automation device 132A, but not to the Syslog collector 24. Furthermore, because the I/Os 154, 156, 158, 160, 162 are not communicatively coupled to the either of the backplanes 136, 138, data messages generated by the I/Os 154, 156, 158, 160, 162 are unable to be received by the Syslog collector 24.

To enable data messages generated by each of the portions of industrial automation devices to be provided to the Syslog collector 24, the portions of the devices may act as event proxy clients and event proxy servers, both of which may be utilized to provide data from one industrial automation device (or portion thereof) to another industrial automation device (or portion thereof). In this manner, industrial automation components that do not include ethernet adapters, automation components that are connected to a different network or backplane than the Syslog collector 24, or both may provide system log messages to the Syslog collector 24. In other words, by utilizing the techniques described below, data messages (e.g., event logs) generated by devices that do not have access to the Syslog collector 24 may be received and forwarded by other devices until the event logs reach a device that has access to the Syslog collector 24, at which point such a device may generate system log messages and provide the system log messages to the Syslog collector 24.

Figure 6:
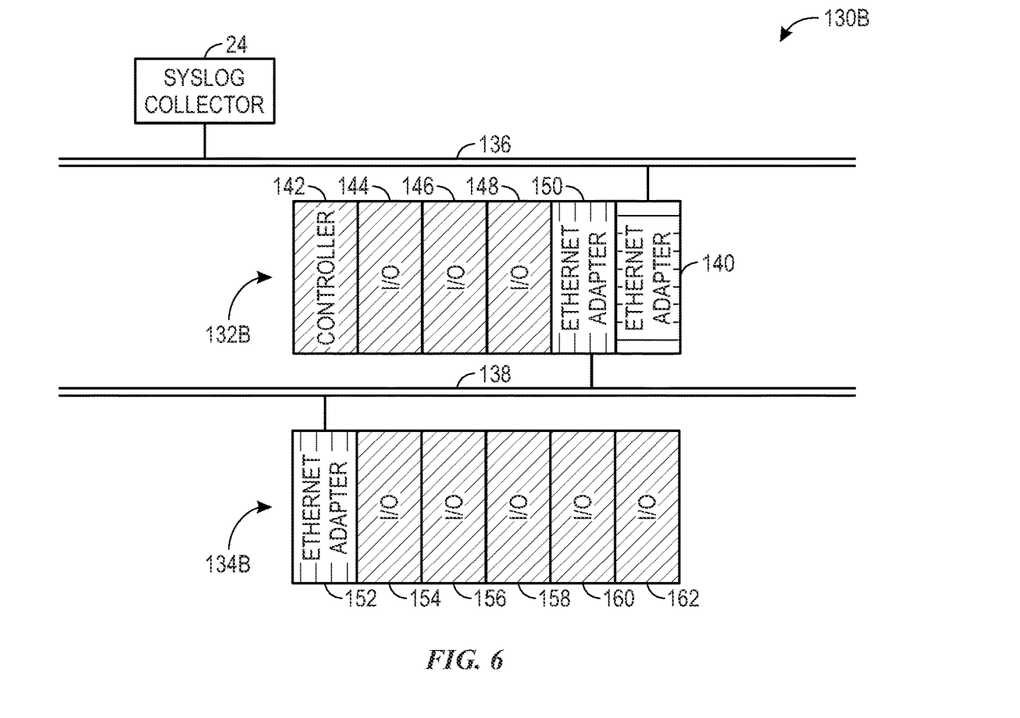
FIG. 6 illustrates a block diagram of an industrial automation system in which log data from each component of the industrial automation system is accessible to a Syslog collector, in accordance with an embodiment presented herein.

Bearing this in mind, FIG. 6 is a block diagram of an industrial automation system 130B that includes the Syslog collector 24, industrial automation devices 132B, 134B, and backplanes 136, 138. More specifically, FIG. 6 depicts an embodiment of the industrial automation system 130 (i.e., industrial automation system 130B) in which the ethernet adaptor 140 is configured as an event proxy server that may receive event log data (e.g., log data or event messages originating from other interfaces or portions of the industrial automation device 132B, such as the controller 142, I/Os 144, 146, 148, and ethernet adapter 150 or log data or data messages that originate from the industrial automation device 134B), generate system log messages from the received data, and send the system log messages to the Syslog collector 24 via the backplane 136 (e.g., using an Ethernet protocol).

More specifically, the controller 142, I/Os 144, 146, 148, and the ethernet adapter 150 may be enabled as event proxy clients, which send event log data (e.g., data messages) to an event proxy server (e.g., the ethernet adaptor 140) using a mechanism that is agnostic to the network transport layer. For instance, event proxy clients may execute computer-readable instructions to utilize an application layer protocol that is supported by multiple devices (e.g., event proxy clients, event proxy servers, and (as discussed below) pseudo-event proxy servers) and that functions over any network transport layers utilized by the devices. In one embodiment, event proxy clients may employ services (e.g., by executing computer-readable instructions) that utilize the Common Industrial Protocol (CIP™) and communicate using various protocols such as Ethernet/IP®, ControlNet®, DeviceNet®, and protocols supported by the backplanes 136, 138. As such, event proxy clients may send data to event proxy servers, which may generate one or more system log messages from the event log data received from the event proxy clients. Moreover, as data (e.g., data messages) is transported (e.g., between event proxy clients until being received by an event proxy server that will generate system log messages to provide to the syslog collector 24), data regarding the pathing of the data (e.g., point of origin and each event proxy client or event proxy server after the point of origin) may be added to the data. That is, the system log messages generated by the event proxy server may include information regarding the point of origin (e.g., a particular device or portion thereof), as well as each device (e.g., event proxy client or event proxy server) through which data used to generate the system log messages were routed. By way of example, each of the system log messages may include a particular format consisting of a number of fields, headers, footers, and other parts of the message (e.g., as defined by the Syslog Protocol). For instance, in some embodiments, the APP-NAME field of the header of the system log message generated by the event proxy server may include details related to the origin and path that the data from which the system log message is generated traversed on route to the event proxy server.

Continuing with the discussion of FIG. 6, each component of the industrial automation device 134B may be configured as an event proxy client. However, event proxy clients that are communicatively coupled (e.g., directly communicatively coupled) to an event proxy client of a different network (or different backplane) may operate as event servers, thereby enabling data from different networks (or backplanes) to ultimately be provided to an event proxy server that can provide a system log message to the Syslog collector 24. For example, the ethernet adaptor 150 and ethernet adaptor 152, which are communicatively coupled via the backplane 138 and which may communicate with one another via using Ethernet protocols, may be event proxy clients that may modify their operations to serve as event proxy servers. Event proxy clients that can function as event proxy servers may be referred to as "pseudo-event proxy servers." Accordingly, the ethernet adapter 152 may receive event log data (e.g., data messages) from the I/Os 154, 156, 158, 160, 162, generate system log messages, and provide the system log messages (or the data received from the I/Os 154, 156, 158, 160, 162) to the ethernet adapter 150. The ethernet adaptor 150 may provide the received system log messages or data to the ethernet adaptor 140, which may provide the system log messages to the Syslog collector 24 or generate system log messages from the received data and provide the system log messages to the Syslog collector 24. Alternatively, the ethernet adapter 150 may generate system log messages, and the Ethernet adaptor 140 may provide the system log messages to the Syslog collector 24. In this manner, data from devices or portions of devices that are unable to generate or send system log messages (e.g., due to not being capable of using Ethernet protocols), as well as devices that are connector a different network (or backplane) than the Syslog collector 24, may be provided to an event proxy server that can generate system log messages, and the system log messages can be provided to the Syslog collector 24. In other words, the event proxy server may receive and convert data originally generated by an industrial automation component that communicates using one protocol into a system log message in accordance with the Syslog Protocol and provide the system log message to the Syslog collector 24.

Figure 7:
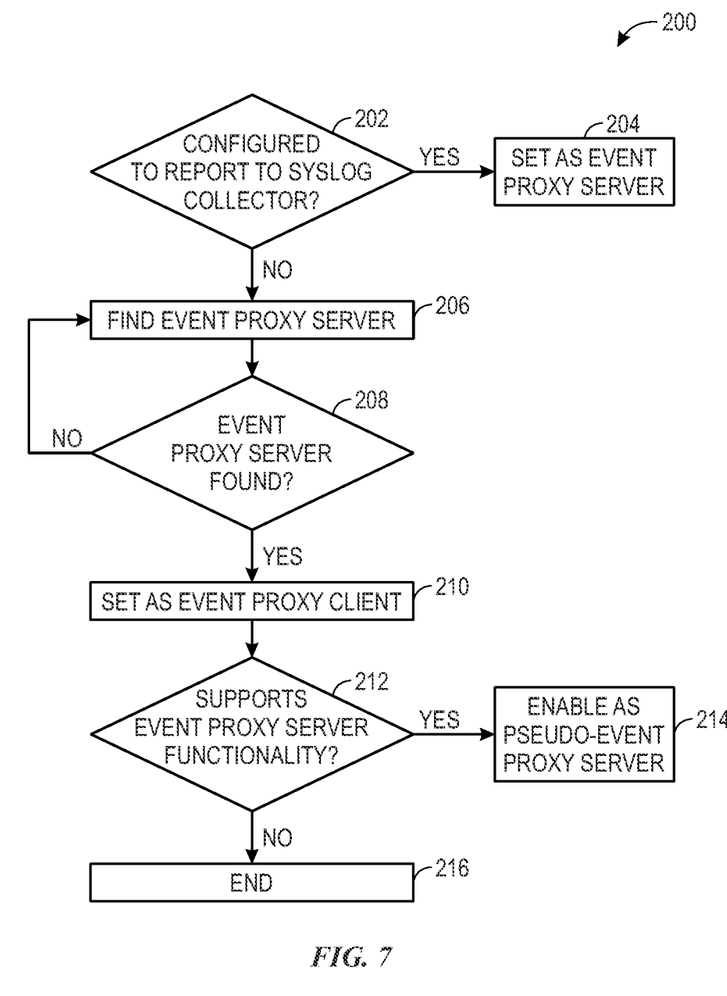
FIG. 7 illustrates a flow diagram of a process for configuring a component of an industrial automation device as an event proxy server, event proxy client, or pseudo-event proxy server, in accordance with an embodiment presented herein.

To configure themselves as event proxy servers, event proxy clients, or pseudo-event proxy servers, the industrial automation devices 132B, 134B or each component of the industrial automation devices 132B, 134B (e.g., controller 142, I/Os 144, 146, 148, 154, 156, 158, 160, 162, and ethernet adapters 140, 150, 152) may include processing circuitry and computer-readable media that include computer-readable instructions that the processing circuitry may execute. Bearing this in mind, FIG. 7 is a flow diagram of a process 200 for configuring a component of an industrial automation device that may be performed by such processing circuitry by executing instructions stored on a computer-readable medium. The processor 200 may be performed, for example, when the industrial automation devices 132B, 134B are powered on or reset.

At decision block 202, the processing circuitry may determine whether the component is configured to report to the Syslog collector 24. In other words, the processing circuitry may determine whether the component is able to directly communicate with the Syslog collector 24. The processing circuitry may make such a determination by reading a value included in the instructions that the processing circuitry executes that is indicative of a setting for the particular component (e.g., one or several bit values indicating that the component should be set as an event proxy server, event proxy client, or pseudo-event proxy server). As another example, the processing circuitry may determine that the component is able to directly communicate with the Syslog collector 24 by determining that the component and the Syslog collector 24 are connected to the same network (e.g., backplane) and that the component can communicate using one or more particular protocols, such as Ethernet protocols. Upon determining that the component is configured to report system log messages to the Syslog collector 24, the processing circuitry may proceed to process block 204 may cause the component to be set as an event proxy server. Additional details related to operating as an event proxy server are described below with reference to FIG. 8.

However, if at decision block 202 the processing circuitry determines that the industrial automation component is not configured to report system log messages to the Syslog collector 24, the processing circuitry may proceed to process block 206 and may cause the component to identify an event proxy server coupled thereto. In other words, the processing circuitry may cause the component to search for another component that has been set as an event proxy server. For example, the processing circuitry may cause requests to be sent within a network or backplane to a component or to another portion of an industrial automation device in which the processing circuitry is included, and determine which responses received are indicative of a component of portion of the industrial automation device being an event proxy server. As another example, the processing circuitry may query each connection to the component in which the processing circuitry is included and determine a component that functions as an event proxy server based on the responses received.

At decision block 208, the processing circuitry may determine whether an event proxy server has been found. If an event proxy server has not been found, the processing circuitry may return to process block 206 to continue searching for an event proxy server. In other words, the processing circuitry may continue to search for an event proxy server until one is located.

If, at decision block 208, the processing circuitry determines that an event proxy server has been found, at process block 210, the processing circuitry may set the component as an event proxy client for the identified event proxy server. As discussed above, the event proxy client may provide data messages (e.g., event log messages or data) to an event proxy server (or pseudo-event proxy server), which may generate system log messages that can be provided to the syslog collector 24.

At decision block 212, the processing circuitry may determine whether the component (e.g., an event proxy client) supports event proxy server functionality. The processing circuitry may make such a determination by reading a value included in the instructions that the processing circuitry executes that is indicative of a setting for the particular component (e.g., one or several bit values indicating that the component should be set as an event proxy server, event proxy client, or pseudo-event proxy server). If the value were indicative that the component should be set as a pseudo-event proxy server, the processing circuitry may determine that the component supports event proxy server functionality. Alternatively, the processing circuitry may determine whether the component includes communication circuitry (e.g., I/O circuitry, ethernet port(s), etc.) that communicatively couples the component to another device (e.g., a different industrial automation device that is connected to a different network or backplane than the syslog collector 24). The processing circuitry may determine that the component supports event proxy server functionality upon determining that the component is communicatively coupled to another industrial automation device. Upon determining that the component supports event proxy server functionality, at process block 214, the processing circuitry may cause the component to be set as a pseudo-event proxy server. For instance, processing circuitry executing computer-readable instructions to perform the process 200 may cause a state of programming object (e.g., a "server" object") to be changed to an "enabled" state. As discussed in more detail below with respect to FIG. 9, pseudo-event proxy servers may receive data from components and provide that data to an event proxy server to be converted into a system log message that can be provided to the Syslog collector 24.

However, if at decision block 212 the processing circuitry determines that the component does not support event proxy server functionality, at process block 216, the process 200 may end. In other words, the component remains set as an event proxy client.

Figure 8:
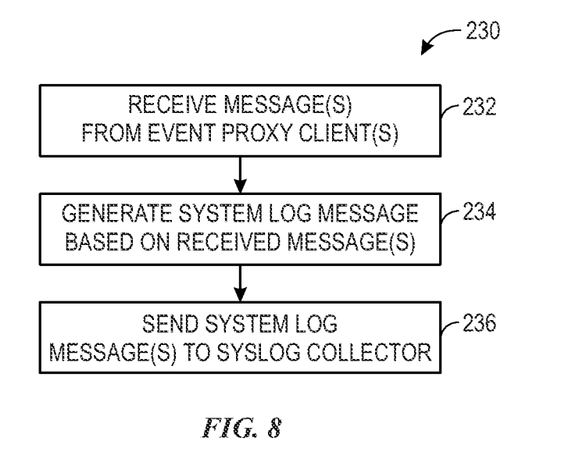
FIG. 8 illustrates flow diagram of a process that an event proxy server may perform to provide a system log or event messages to a Syslog collector based on event log data received from another component, in accordance with an embodiment presented herein.

Keeping the foregoing in mind and referring back to process block 204, FIG. 8 is a flow diagram of a process 230 that a component may perform after being set as an event proxy server. Indeed, the event proxy server may provide a system log message to the Syslog collector 24 based on event log data received from another component. The process 230 may be performed after performing process block 204 of the process 200 discussed above with respect to FIG. 7.

At process block 232, the event proxy server may receive one or more messages from one or more event proxy clients. The messages may be, or include, event log data generated by the event proxy clients. As discussed above, such data may be sent using a communication protocol other than an Ethernet protocol. For example, a component of an industrial automation device may be communicatively coupled to the event proxy server via a connection other than an Ethernet connection.

At process block 234, event proxy server may generate one or more system log messages from the received messages. As discussed above, the headers of the system log messages may include data indicating the origin of the system log messages (or underlying data for the system log messages) as well as the path of the data (e.g., from origin to the event proxy server, inclusive of both). Furthermore, while received data may be formatted a particular way (e.g., in accordance with another data format), the event proxy server may reformat the received data in accordance with the Syslog Protocol.

At process block 236, the event proxy server may send the system log messages to the Syslog collector 24. For example, the event proxy server may send the system log messages in accordance with an Ethernet protocol to the Syslog collector 24. In other words, an Ethernet connection to the Syslog collector 24 may be utilized to send the system log messages to the Syslog collector 24. More specifically, the event proxy server may send system log messages to the Syslog collector 24 using a Transmission Control Protocol (TCP) port or User Datagram Protocol UDP) port included as an Ethernet adaptor (e.g., Ethernet port 32, Ethernet adaptor 140).

Figure 9:
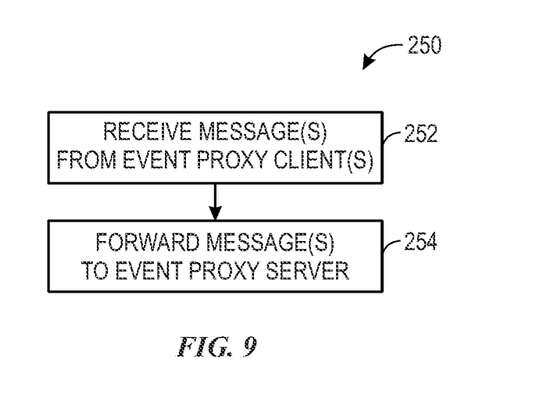
FIG. 9 illustrates a flow diagram of a process that a pseudo-event proxy server may perform to forward data to an event proxy server, in accordance with an embodiment presented herein.

FIG. 9 is a flow diagram of a process 250 that a pseudo-event proxy server may perform to forward data to an event proxy server. The process 250 may be performed, for example, after a component has been set as a pseudo-event proxy server at process block 214 of the process 200 of FIG. 7.

At process block 252, the pseudo-event proxy server may receive messages from event proxy clients. The messages may be, or include, event log data generated by the event proxy clients. As discussed above, such data may be sent using a communication protocol other than an Ethernet protocol. For example, a component of an industrial automation device may be communicatively coupled to the pseudo-event proxy server via a connection other than an Ethernet connection. The pseudo-event proxy server may receive messages from event proxy clients in response to advertising being capable of functioning as an event proxy server or in response to being queried by other devices or components (e.g., event proxy clients). For instance, the pseudo-event proxy server may communicate to event proxy clients and other pseudo-event proxy servers that the pseudo-event proxy server can function as an event proxy server and receive messages in response to such communications. Additionally, the event proxy clients and the other pseudo-event proxy servers may query the pseudo-event proxy server to determine the whether the "server" object of the pseudo-event proxy server has an "enabled" state. In response to determining the "server" object of the pseudo-event proxy server has an "enabled" state, the event proxy clients and other pseudo-event proxy servers may determine that the pseudo-event proxy server is a pseudo-event proxy server and send messages (e.g., event log data) to the pseudo-event proxy server.

At process block 254, the pseudo-event proxy server may forward the received messages to an event proxy server or another pseudo-event proxy server. The pseudo-event proxy server may utilize a communication protocol other than an Ethernet protocol to do so. However, if the pseudo-event proxy server and the event proxy server or another pseudo-event proxy server to which the messages will be sent support Ethernet protocols, the pseudo-event proxy server may forward the messages using an Ethernet protocol. In such a case, the pseudo-event proxy server may generate system log messages from the messages and provide the system log messages to an event proxy server or another pseudo-event proxy server.

Accordingly, the techniques described herein enable log data from industrial automation devices that are not on the same network or that do not support a particular communication protocol to be provided to a log collector (e.g., syslog collector 24). More specifically, the techniques described above enable log data to be sent across unconverged networks using several different transport mechanisms and protocols, system log messages to be generated from the log data, and the system log messages to be provided to a Syslog collector (e.g., to be utilized to make security or control decisions regarding an industrial automation system). As such, these techniques may increase the security of an industrial automation system while enhancing the functionality of industrial automation devices that are not on the same network or that do not support the same communication protocol(s) as a log collector.

While only certain features of the present embodiments described herein have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An industrial automation system, comprising:
a collector component communicatively coupled to a first network and configured to receive one or more event logs via a first communication protocol;
a first industrial automation component communicatively coupled to the first network and the collector component, wherein the first industrial automation component is configured to communicate via the first communication protocol;
a second industrial automation component configured to:
communicate via a second communication protocol different from the first communication protocol;
generate a first event log representative of a property associated with the second industrial automation component; and
send the first event log using the second communication protocol; and
a third industrial automation component communicatively coupled to the first industrial automation component and the second industrial automation component, wherein the third industrial automation component is configured to:
receive the first event log from the second industrial automation component sent using the second communication protocol; and
convert the first event log into a second event log interpretable by the collector component; and send the second event log to the first industrial automation component using the first communication protocol, wherein the first industrial automation component is configured to send the second event log to the collector component via the first network, wherein the second event log sent by the first industrial automation component comprises data indicative of:
- the second industrial automation component being the origin of the first event log; and
- the third industrial automation component having received the first event log from the second industrial automation component.

2. The industrial automation system of claim 1, wherein the first communication protocol is an ethernet protocol.

3. The industrial automation system of claim 1, wherein the second event log comprises a Syslog message.

4. The industrial automation system of claim 1, wherein the second industrial automation component is:
- communicatively coupled to a second network different from the first network; and
- not communicatively coupled to the first network.

5. The industrial automation system of claim 4, wherein the first network comprises a first backplane, and the second network comprises a second backplane different than the first backplane.

6. The industrial automation system of claim 4, wherein the second communication network comprises a ControlNet network, a DeviceNet network, a Data Highway Plus network, a Remote I/O network, a Foundation Fieldbus network, a Serial, DH-485 network, a SynchLink network, or any combination thereof.

7. The industrial automation system of claim 1, comprising an industrial automation device, wherein the industrial automation device comprises first industrial automation component and the second industrial automation component.

8. The industrial automation system of claim 1, comprising a fourth industrial automation component communicatively coupled to the first industrial automation component and configured to communicate with the third industrial automation component via the second communication protocol, wherein the third industrial automation component is configured to send the second event log to the first industrial automation component via the fourth industrial automation component.

9. The industrial automation system of claim 8, wherein:
- the first industrial automation component and the fourth industrial automation component are included in a first industrial automation device of an industrial automation system; and
- the second industrial automation component and the third industrial automation component are included in a second industrial automation device of the industrial automation system.

10. A non-transitory computer-readable medium comprising instructions that, when executed, cause processing circuitry of a first industrial automation component to:
- receive, from a second industrial automation component using a first communication protocol, log data representative of a property associated with the second industrial automation component;
- generate, from the log data, one or more system log messages that are communicable using a second protocol that is different than the first communication protocol, wherein the one or more system log messages comprise data indicative of:
  - the second industrial automation component being the origin of the log data; and
  - the first industrial automation component having received the log data from the second industrial automation component; and
- send the one or more system log messages to a third industrial automation component using the second communication protocol, wherein the third industrial automation component is communicatively coupled to a syslog collector and configured to send the one or more system log messages to the syslog collector using the second communication protocol.

11. The non-transitory computer-readable medium of claim 10, wherein:
- the third industrial automation component is communicatively coupled to the syslog collector via a first network; and
- the second industrial automation component is communicatively coupled to a second network that is different than the first network.

12. The non-transitory computer-readable medium of claim 10, wherein the instructions, when executed, cause the processing circuitry to:
- determine whether the first industrial automation component is configured to report to the syslog collector; and
- receive the log data from the second industrial automation component after determining that the first industrial automation component is configured to report to the syslog collector.

13. The non-transitory computer-readable medium of claim 10, wherein:
- the first industrial automation component industrial automation component comprises an Ethernet adaptor; and
- the second communication protocol comprises an Ethernet protocol.

14. A computer-implemented method, comprising:
- receiving, via a first industrial automation component, log data from a second industrial automation component using a first communication protocol, wherein the log data is representative of a property associated with the second industrial automation component;
- generating, via the first industrial automation component, one or more system log messages from the log data, wherein the one or more system log messages comprise data indicative of:
  - the second industrial automation component being the origin of the log data; and
  - the first industrial automation component having received the log data from the second industrial automation component; and
- sending, via the first industrial automation component using a second communication protocol that is different than the first communication protocol, the one or more system log messages to a third industrial automation component, wherein the third industrial automation component is communicatively coupled to a syslog collector and configured to send the one or more system log messages to the syslog collector using the second communication protocol.

15. The computer-implemented method of claim 14, wherein the first communication protocol is unsupported by the second industrial automation component.

16. The computer-implemented method of claim 15, wherein the first industrial automation component and the second industrial automation component are portions of an industrial automation device.

17. The computer-implemented method of claim 15, wherein the second communication protocol comprises an Ethernet protocol.

18. The computer-implemented method of claim 14, wherein the first industrial automation component comprises a controller of an industrial automation system.

19. The computer-implemented method of claim 14, comprising:
- receiving, via the first industrial automation component, second log data from the second industrial automation component using a first communication protocol, wherein the second log data is representative of the property associated with the second industrial automation component;
- sending, via the first industrial automation component using the second communication protocol, the second log data to the third industrial automation component; and
- generating, by the third industrial automation component, one or more second system log messages from the second log data, wherein the second log data comprises second data indicative of:
  - the second industrial automation component being the origin of the second log data;
  - the first industrial automation component having received the log data from the second industrial automation component; and
  - the third industrial automation component having received the log data from the first industrial automation component.

20. The computer-implemented method of claim 14, wherein:
- the first industrial automation component comprises a first Ethernet adaptor of a first industrial automation device of an industrial automation system; and
- the third industrial automation component comprises a second Ethernet adaptor of a second industrial automation device of the industrial automation system.

* * * * *